United States Patent [19]
Thomas

[11] Patent Number: 6,128,638
[45] Date of Patent: Oct. 3, 2000

[54] METHOD AND APPARATUS FOR CALCULATING X TO THE EXPONENT OF Y

[75] Inventor: Jeffrey Oliver Thomas, Fremont, Calif.

[73] Assignee: Silicon Graphics, Inc., Mountain View, Calif.

[21] Appl. No.: 09/121,157

[22] Filed: Jul. 23, 1998

[51] Int. Cl.[7] ....................................................... G06F 7/38
[52] U.S. Cl. ............................................. 708/606; 708/512
[58] Field of Search ..................................... 708/277, 512, 708/517, 606

[56] References Cited

U.S. PATENT DOCUMENTS

| | | | |
|---|---|---|---|
| 4,158,889 | 6/1979 | Monden | 708/606 |
| 5,553,012 | 9/1996 | Buss et al. | 708/277 |
| 5,926,406 | 7/1999 | Tucker et al. | 708/606 |

*Primary Examiner*—Chuong Dinh Ngo
*Attorney, Agent, or Firm*—Sterne, Kessler, Goldstein & Fox P.L.L.C.

[57] ABSTRACT

A hardware implementation solves for the value of $X^Y$, where X and Y are real (fixed point or floating point) numbers by using the formula $X^Y = \exp(\log_e(X^Y)) = \exp(\ln(X^Y)) = \exp(Y*\ln(X))$. A fixed point representation of X, output from a flip-flop, is used to address a floating point data output from an ln(X) ROM lookup table. The floating point data output is output from a second flip-flop and multiplied by Y in a multiplier to yield a product. The product is output from a third flip-flop to address a fixed point data output from an exp(X) ROM lookup table. The fixed point data output is latched by and output from a third flip-flop. The fixed point data output approximates $X^Y$, using a minimal amount of die area on the semiconductor and minimal amount of processing power. Also, the present invention can be fully pipelined, such that one calculation can be conducted every cycle and operations can occur simultaneously.

15 Claims, 8 Drawing Sheets

METHOD AND APPARATUS FOR CALCULATING X TO THE EXPONENT OF Y

BACKGROUND OF THE INVENTION

1. Field of the Invention

The present invention relates to the field of computer hardware design.

2. Related Art

Determining the solution of a first real value raised to a second real value, such as $X^Y$, where X and Y respectively represent real (fixed point or floating point) numbers has proven to be a difficult problem for semiconductor ("chip") designers in the field of computer hardware. The function is non-linear, providing values that vary unevenly over a fixed, short range of X and Y.

One field where the calculation is important is computer graphics. In the OpenGL™ software interface for graphics hardware, the light associated with a graphics object is represented by four components: global light, ambient light, diffuse light, and specular light. Each of the four components is calculated by multiplying the amount of light associated with a material (for that component) by the amount of light associated with a light source (for that component). Diffuse light and specular light include scaling factors. The scaling factor for diffuse light is the dot product of a vector normal to the graphical object (normal vector) and a vector directed onto the graphical object from a light source (light vector). The scaling factor for specular light is the dot product of the normal vector and a vector representing the reflection of light from the graphical object (specular vector), raised to an exponent representing the amount of shininess of the graphical object. In this context the specular light dot product represents X, and the amount of shininess represents Y.

To provide a solution for $X^Y$, the chip designer must balance cost with accuracy. RAM lookup tables and approximation techniques using ROMs have been used to calculate the function. For even reasonable approximations, the chip designer must choose between wasting much die area on the chip or wasting much processing power and/or time.

For example, a RAM lookup table can be used to calculate the function. The conventional RAM lookup table stores values for a fixed Y. In other words, for each fixed value of Y, the entire RAM lookup table is filled with data at location X corresponding to $X^Y$. Unfortunately, each time the value of Y is changed, all of the entries in the RAM lookup table must be re-stored. For 10-bit addressing, with 1024 table entries, 1024 processor cycles are wasted when Y is changed. Accordingly some chip designers will reduce the number of bits for the address inputs and data outputs, which reduces the number of processor cycles, but which also reduces the precision of data outputs.

For higher end hardware systems, approximation techniques such as Newton-Raphson or Taylor Series expansion can be used. In these systems, ROM lookup tables for seeding and then large amounts of hardware are used which require large die area on the chip. For this reason, such systems are quite costly.

Accordingly, there is a need to quickly and accurately determine a hardware solution for $X^Y$, which wastes minimum die area on the chip or processing power of the computer. A hardware solution that determines $X^Y$ is needed that does not loop. Such a loop stalls a pipeline which must stop and wait for the hardware solution for $X^Y$ to complete.

SUMMARY OF THE INVENTION

The present invention is a method and apparatus for approximating the value of $X^Y$ in a computer hardware, where X and Y are real numbers, expressed in either floating point or fixed point notation. The value of X is latched in a fixed point representation by a first flip-flop. The fixed point representation of X is output from the flop-flop at cycle 0 of a processing pipeline, and used as an address input into a natural logarithm (i.e., ln(X)) ROM lookup table to determine a floating point data output. This floating point data output from the ln(X) ROM lookup table approximates the natural logarithm of the fixed point representation of X.

The floating point data output from the ln(X) ROM lookup table is latched by a second flip-flop and output therefrom at cycle 1 of the processing pipeline. This output from the second flip-flop (i.e., the floating point data output) is multiplied by a floating point representation of Y to yield a product. In one embodiment, the product is "clamped down" at its large values so that a predesignated value greater than the maximum output required is not exceeded.

The product, having a floating point format, is latched by a third flip-flop and output therefrom at cycle 2 of the processing pipeline. The output from the third flip-flop (i.e., the floating point product) is used as an address input into an exponent of e (i.e., exp(X)) ROM lookup table to determine a fixed point data output. This fixed point data output from the ln(X) ROM lookup table approximates the value of $X^Y$. A fourth flip-flop latches the fixed point data output and outputs it therefrom at cycle 3 of the processing pipeline.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

In the figures, like reference numbers generally indicate identical, functionally similar, and/or structurally similar elements. The figure in which an element first appears is indicated by the leftmost digit(s) in the reference number. The elements within the figures are functional entities and may or may not be separate physical entities.

DETAILED DESCRIPTION OF THE PREFERRED EMBODIMENTS

Table of Contents

I. The example environment
II. A context for the present invention
   A. The purpose
   B. The context in detail
      1. The OpenGL ™ environment
      2. The physics of graphical lighting illumination
III. The particulars of the present invention
   A. The problem with known systems
   B. The present invention in detail
IV. An Implementation of the Invention

I. The Example Environment

The present invention is described in terms of an example environment. The example environment uses the OpenGL™ software interface for graphics hardware. The OpenGL™ interface consists of hundreds of functions that permit graphics programmers to specify graphical objects. Specifically, OpenGL™ permits the user programmer to render two and three dimensional objects into a frame buffer for storage as pixels. The resulting pixels are read by hardware that produces a physical display of the pixels. The following references on OpenGL™ and the X Window System are hereby incorporated by reference in their entirety: OpenGL™ Reference Manual, Second Edition, Addison-Wesley Developers Press, 1997, ISBN 0-201-46140-4, OpenGL™ Architecture Review Board: Jackie Neider, Tom Davis, Mason Woo; OpenGL™ Programming Guide, Addison-Wesley Developers, 1993, ISBN 0-201-63274-8, OpenGL™ Architecture Review Board: Jackie Neider, Tom Davis, Mason Woo; and OpenGL™ Programming for the X Window System, Addison-Wesley Developers Press, 1996, ISBN 0-201-48359-9, Mark J. Kilgard.

Although the invention is described in terms of this example environment, description in these terms is provided for convenience only. It is not intended that the invention be limited to the application in this example environment. In fact, after reading the following description, it will become apparent to a person skilled in the relevant art how to implement the invention in alternative environments. The same concepts and techniques as used for the present invention can be used for other comparable environments, including other software interfaces to graphics hardware, other operating systems and other windowing systems. In fact, the present invention can be implemented on the hardware of any computer system or processor, embedded processor, integrated circuit, or chip. Therefore, for the remainder of the specification the OpenG™ graphical interface is described only for exemplary purposes and not by way of limitation to the invention. Of course, OpenGL™ does not require the present invention.

II. A Context for the Present Invention

A. The Purpose

The present invention is directed to solving the mathematics problem of calculating the value of $X^Y$, where X and Y respectively represent real numbers. X and Y are defined with n or fewer bits of precision in fixed point or floating point notation. For the present invention, the exemplary context is that of calculating $X^Y$ using hardware functionality in a computer lighting application for the OpenGL™ graphical interface. The following is presented to provide a better understanding for the context of the present invention.

B. The Context in Detail

1. The OpenGL™ Environment

Figure 1:
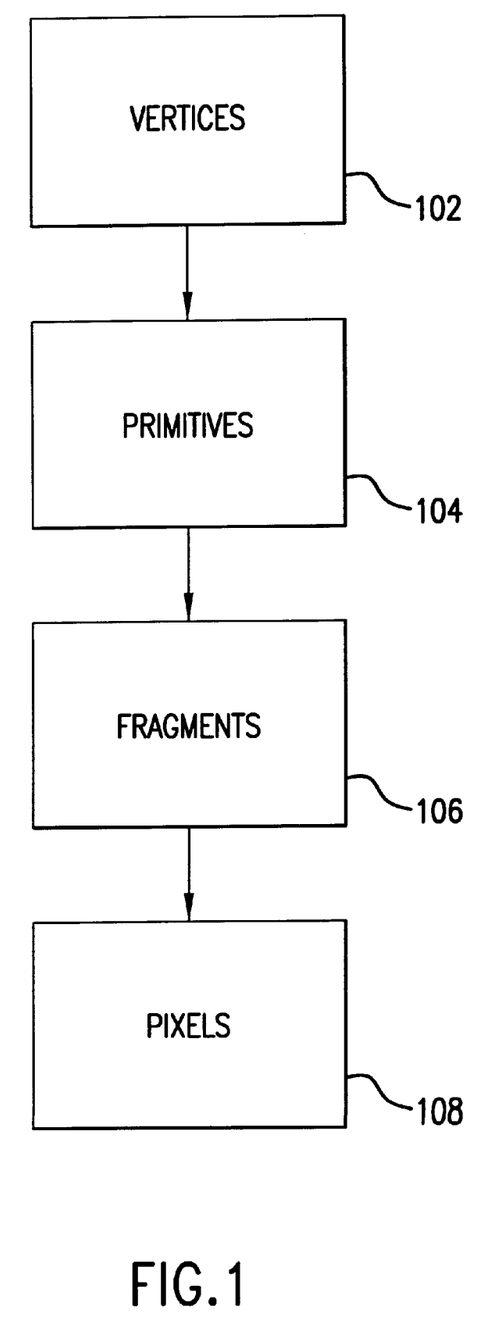
FIG. 1 illustrates an OpenGL™ pipeline hierarchy.

FIG. 1 illustrates a pipeline hierarchy for the OpenGL™ software interface for graphics hardware. Initially, vertices 102 describing the shapes of desired geometric objects (points, line segments and polygons) are created. These vertices 102 are assembled into primitives 104, which are geometric objects with edge flags, color and texture information. The primitives 104 are rasterized into two dimensional images called fragments 106, comprising points and associated color, depth and texture data. Finally the fragments 106 are combined into pixels 108 in a frame buffer. Each pixel stores the information of a point on a display.

Figure 2:
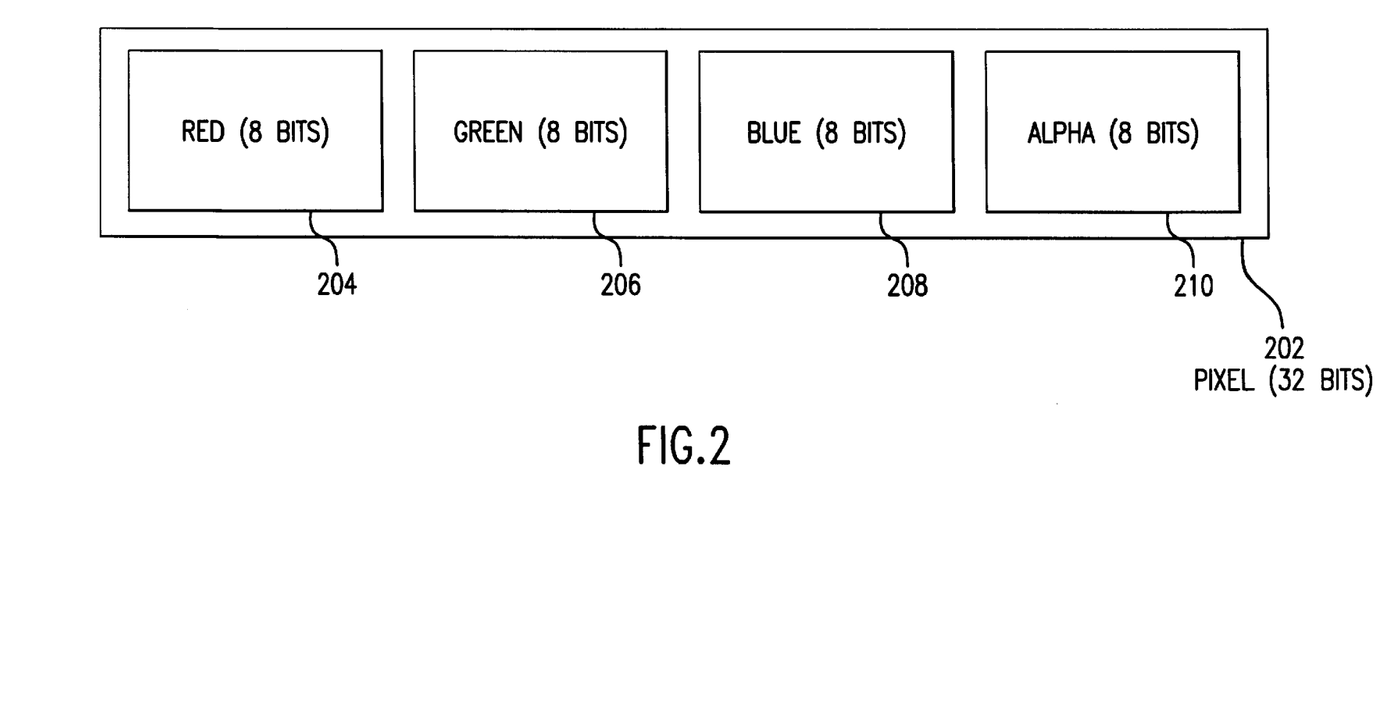
FIG. 2 illustrates an exemplary pixel for a multispectral color model display.

FIG. 2 illustrates an exemplary pixel 202 for an exemplary color model display. Pixel 202 stores information from four channels. These four channels are red 204, green 206, blue 208 and alpha 210. The red 204, green 206 and blue 208 channels, comprising 8 bits each, provide image color information. Any color portion of a pixel image can be represented by the combination of red channel 204, green channel 206 and blue channel 208. The alpha channel, also comprising 8 bits, represents the opacity of the pixel image, ranging from opaque to transparent. Accordingly, each pixel 202 is stored in the frame buffer as a combination of these four channels for the color model system.

Figure 3:
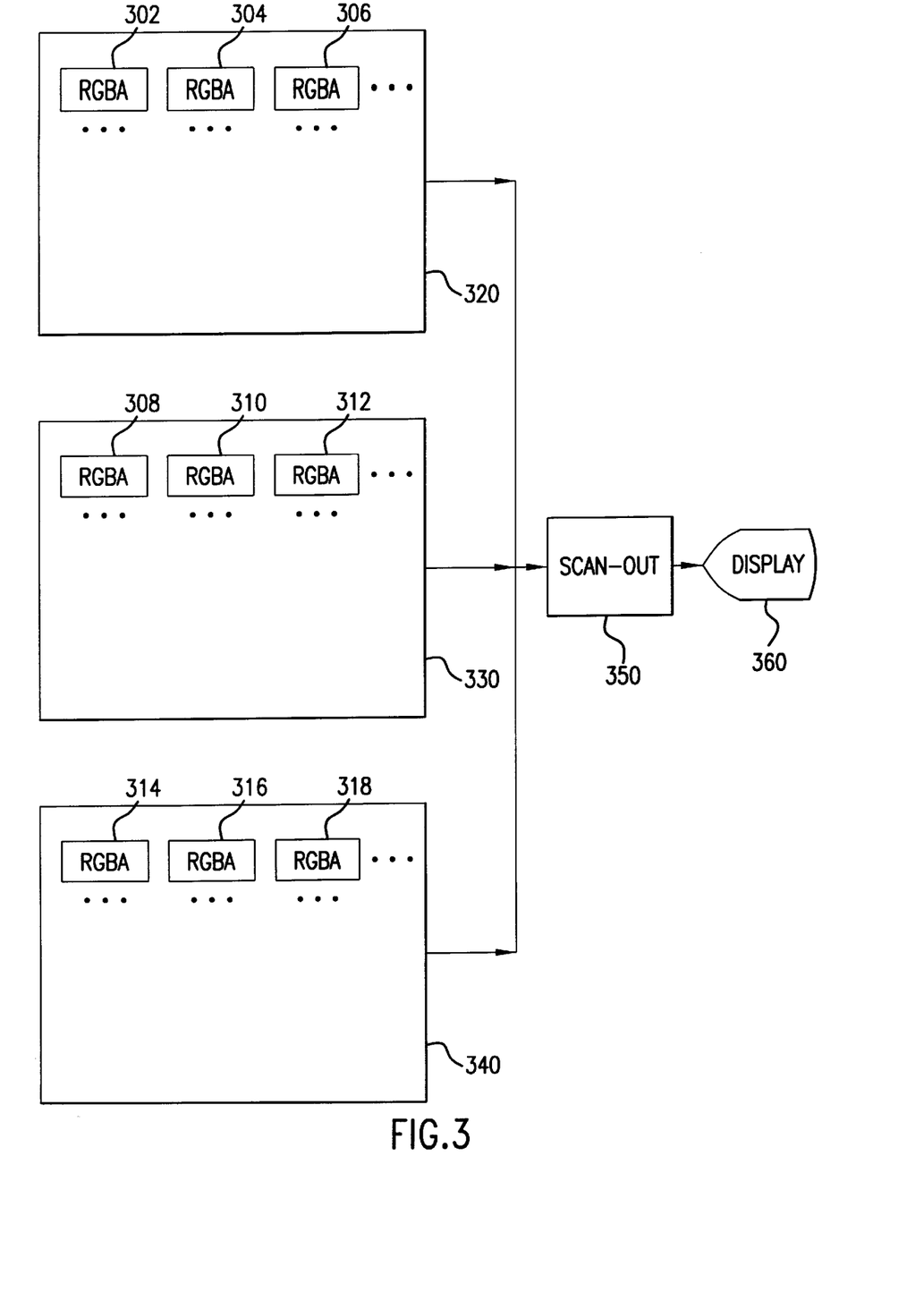
FIG. 3 illustrates an exemplary frame buffer environment.

FIG. 3 illustrates an exemplary frame buffer environment. As shown therein, it is possible to use more than one frame buffer to store the pixels. In fact, FIG. 3 illustrates a first frame buffer 302 a second frame buffer 330 and a third frame buffer 340. Frame buffer 320 comprises numerous pixels, of which pixels 302, 304 and 306 are shown. Similarly, frame buffer 330 includes pixels 308–312 and frame buffer 340 includes pixels 314–318. Each of these frame buffers can store an entire image at any given time.

The frame buffers 320–340 are connected to a hardware scan-out device 350. The scan-out device 350 selectively reads the pixel information from one of the frame buffers 320–340 and transmits it to display 360 for physical display. The pixels comprising the frame buffer being displayed are referred to as an on-screen image, whereas the pixels of the frame buffers not being displayed are referred to as off-screen images. The frame buffers 320–340 can also store pixel information transmitted from other regions of memory or write pixel information to other regions of memory.

2. The Physics of Graphical Lighting Illumination

Figure 4:
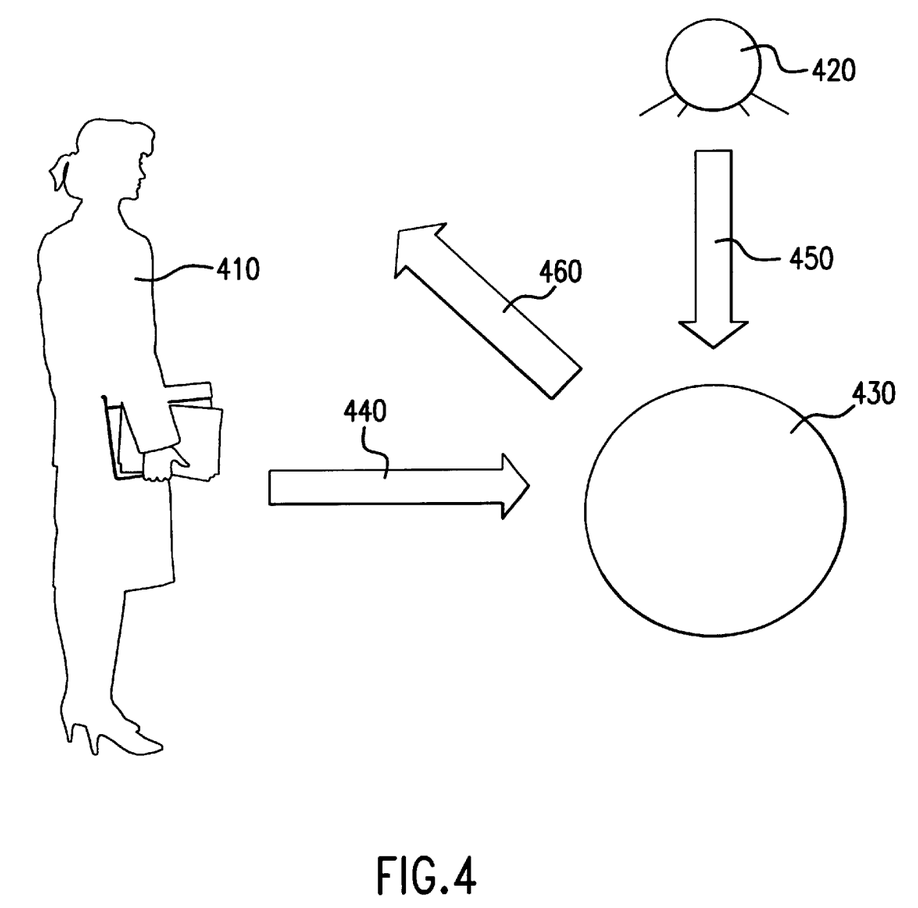
FIG. 4 illustrates an exemplary light illumination environment.

FIG. 4 illustrates the physical aspects of light illumination. FIG. 4 includes an observer 410, a point source of light 420, and an illuminated spherical object 430.

Any representation of the physical light associated with spherical object 430 can be represented to comprise three components: ambient light, diffuse light, and specular light. Ambient light is the light component that is always present in any representation of spherical object 430.

Equation (1) expresses the formula used to calculate the amount of ambient light associated with a graphical object (i.e., a graphical representation of spherical object 430), specifically in the context of the OpenGL™ software interface.

$$\text{ambient\_light} = \text{ambient\_light}_{material} * \text{ambient\_light}_{light\ source}. \quad (1)$$

The value for ambient light exhibits a range from 0 to 1 (full). In equation (1), the ambient light associated with a graphical object is equal to the ambient light of the material itself, multiplied by the ambient light of the light source.

Diffuse light is a light component that is directional in character. For example, the side of spherical object 430 illuminated by light source 420 will have more diffuse light presence than the parts of spherical object 430 not so illuminated.

Equation (2) expresses the formula used to calculate the amount of diffuse light associated with a graphical object, in the same context.

$$\text{diffuse light} = (\text{light\_vector} \cdot \text{normal\_vector}) * \text{diffuse light}_{material} * \text{diffuse light\_light}_{light\ source}. \quad (2)$$

In equation (2), the diffuse light associated with a graphical object is equal to the dot product of the unit light vector 450 and the unit normal vector 440, multiplied by the diffuse light of the material, which is multiplied by the diffuse light of the light source. In the representation of FIG. 4, the light vector 450 is the unitized vector from light source 420 to spherical object 430. The normal vector 440 is a vector that is the unitized normal of the spherical object 430. The normal is the vector projected directly away from the surface of the spherical object. In the context of computer graphics, specifically in an OpenGL™ environment the normal vector 440 is assumed to be a vector at an angle orthogonal to the plane of the display. The dot product of the light vector 450 and the normal vector 440 is a measure of how much the light vector 450 (direction of the light) and the normal vector 440 of the surface line up (i.e., coincide) with one another.

Specular light is also a directional light component, but it also has a non-linear fading (drop-off) character that depends upon the coincidence (line-up) of the normal vector with the reflection (specular) vector. The amount of non-linearity in the drop-off component is the "shininess," as explained further below.

Equation (3) expresses the formula used to calculate the amount of specular light associated with a graphical object, in the same context.

$$\text{specular light} = (\text{specular\_vector} \cdot \text{normal\_vector})^{shininess\ amount} * \text{specular\_light}_{material} * \text{specular\_light}_{light\ source}. \quad (3)$$

In equation (3), the specular light associated with a graphical object is equal to the dot product of the specular vector 460 and the normal vector 440, raised to the exponent of the shininess amount, multiplied by the specular light of the material, which is multiplied by the specular light of the light source. In the representation of FIG. 4, the specular vector 460 is a reflection vector in-between the normal vector 440 and the eyepoint vector to the object 450. Accordingly, the dot product of the specular (reflection) vector 460 and the normal vector 440 is a measure of how much the specular vector 460 and the normal vector 440 line up (i.e., coincide) with one another.

The shininess amount, which is the exponent of the dot product, represents the physical shininess of the spherical object 430, i.e., how true of a reflection is projected by an object receiving a source of light. Shiny objects (objects with large shininess values, such as metallic objects) reflect a light source in a smaller and brighter area than dull objects. The reflection of a light source from shiny objects falls off more rapidly than for duller objects.

If the dot product of the specular vector 460 and the normal vector 440 is represented by the variable X, and the shininess amount is represented by the variable Y, then the value for $X^Y$ is a key component of the specular light determination of equation (3).

Equation (4) represent the complete light components for a graphical scene.

$$\text{scene light} = \text{Emission} + \text{Global\_Ambient} + \Sigma \text{Attenuation} * \text{Spotlight} * (\text{object\_light}) \text{Total\_sources} \quad (4)$$

All of the terms in equation (4) are defined in the paragraphs below. The object light represents the total amount of ambient light (from equation (1)) plus diffuse light (from equation (2)) plus specular light (from equation (3)) for a graphical representation of an object.

In OpenGL™, for each of the light components ambient light, diffuse light and specular light, the total light is specified by its material and light components. Initially, the light colors are specified in parameter list by a variable such as redAmbient[ ]={0.3, 0.1, 0.1, 1.0} (with bracketed values respectively corresponding to red, green, blue, and alpha components). Then the light colors are applied to the materials by a command such as glMaterialfv(GLenum face. Glenum pname, const Flfloat *params). Here, "face" specifies which face of the object is being updated (i.e., front or back), "pname" specifies the material parameter of the face that is being updated (e.g., content, diffuse, specular, shininess), and "params" specifies a pointer of the values to which pname will be set. The "params" field is the same as the light color parameter list. Examples of the command include: (1) glMaterialfv(GL_FRONT, GL_AMBIENT, redAmbient): (2) glMaterialfv(GL_FRONT, GL_DIFFUSE, redDiffuse); (3) glMaterialfv(GL, FRONT, GL_SPECULAR, whiteSpecular); (4) glMaterialfv(GL_FRONT, GL_SHININESS, 100.0). The light component is specified in the same manner by the command glLightfv (GI,enum face, Glenum pname, const Flfloat *params).

In the OpenGL™ context, each object is divided into many infinitesimal triangles, and the amount of ambient light, diffuse light, and specular light are calculated for each point of every triangle, with three vertices per triangle. Each triangle comprises numerous pixels lit in the shape of a triangle. In the OpenGL™0 context, for example, the single command auxSolidSphereo() determines the triangles and sends them to the hardware, which in turn draws the triangles.

The above-noted dot products serve as scaling factors for the product of light factor of the material (material component) and light factor of the light sources (light component). In one embodiment, the light vector 450 and the specular vector 460 are calculated by the OpenGL™ driver, the normal vector is automatically calculated by, for example, the auxSolidSphere() command, and the dot products are calculated in the actual hardware. Here, the calculation of $X^Y$, which represents (specular_vector·normal_vector)$^{shininess\ amount}$, is performed in the hardware. In alternative embodiments, however, one or more of these parameters can be calculated by either the OpenGL™ driver, other hardware, or higher-level software developed by the programmer.

The quantity "Spotlight" represents the spotlight character of the light source. The spotlight character signifies a type of light source that shines only in a directed area. The spotlight character is also determined by the coincidence of an object from the center of a light direction. This value is typically calculated by the OpenGL™ driver.

The quantity "Attenuation" represents the total attenuation factor (not always linear) for the light source. This total attenuation factor determines the "all-off"0 of the light away from its maximum illuminance. This quantity is typically generated by a glLight call, such as glLightfv(), with GL_LINEAR_ATTENUATION specified as the "pname" parameter. The value is typically passed directly to the hardware.

The amount of Spotlight, Attenuation, and object light are multiplied by one another for each source of light, and multiplied against the sum of all of the sources of light. To this summation are added the "Emission" and the "Global Ambient" light components. Emission is the property of certain types of objects to generate light. For example, phosphorescent materials generate their own light. Global Ambient (e.g., provided by a glLightModel() call) represents a base light. This base light is a non-directional light that illuminates every object equally.

The scene light defined by equation (4), which equals the addition of the above-noted summation to the Emission and the Global Ambient, represents the total light associated with the scene. In one embodiment, these calculations are performed by the hardware. In another embodiment, these calculations are performed by the OpenGL™ driver.

III. The Particulars of the Present Invention

A. The Problem with Known Systems

As noted, an important calculation in determining the specular light is the dot product of the specular vector 460 and the normal vector 440, represented by the variable X, raised to the exponent of the shininess amount, represented by the variable Y. In other words, in determining the specular light, the value for $X^Y$ must be determined.

As will be recognized by those skilled in the hardware arts, determining the value for $X^Y$ is a difficult problem, regardless of the context wherein the problem arises, whether it be in the context of computer graphics as provided above (specifically relating to an OpenGL™ graphical interface) or in any other context. The inventive solution provided herein is not limited to the context of computer graphics, and applies to any context of solving $X^Y$ using computer hardware.

Unfortunately for the semiconductor ("chip") designer, the function is non-linear, providing $X^Y$ values which vary greatly over a fixed, short range for X and Y. To provide an even reasonable approximation using ROM and RAM tables, the chip designer must settle for either wasting much area on the chip or wasting much processing power, as the following illustrates.

Figure 5:
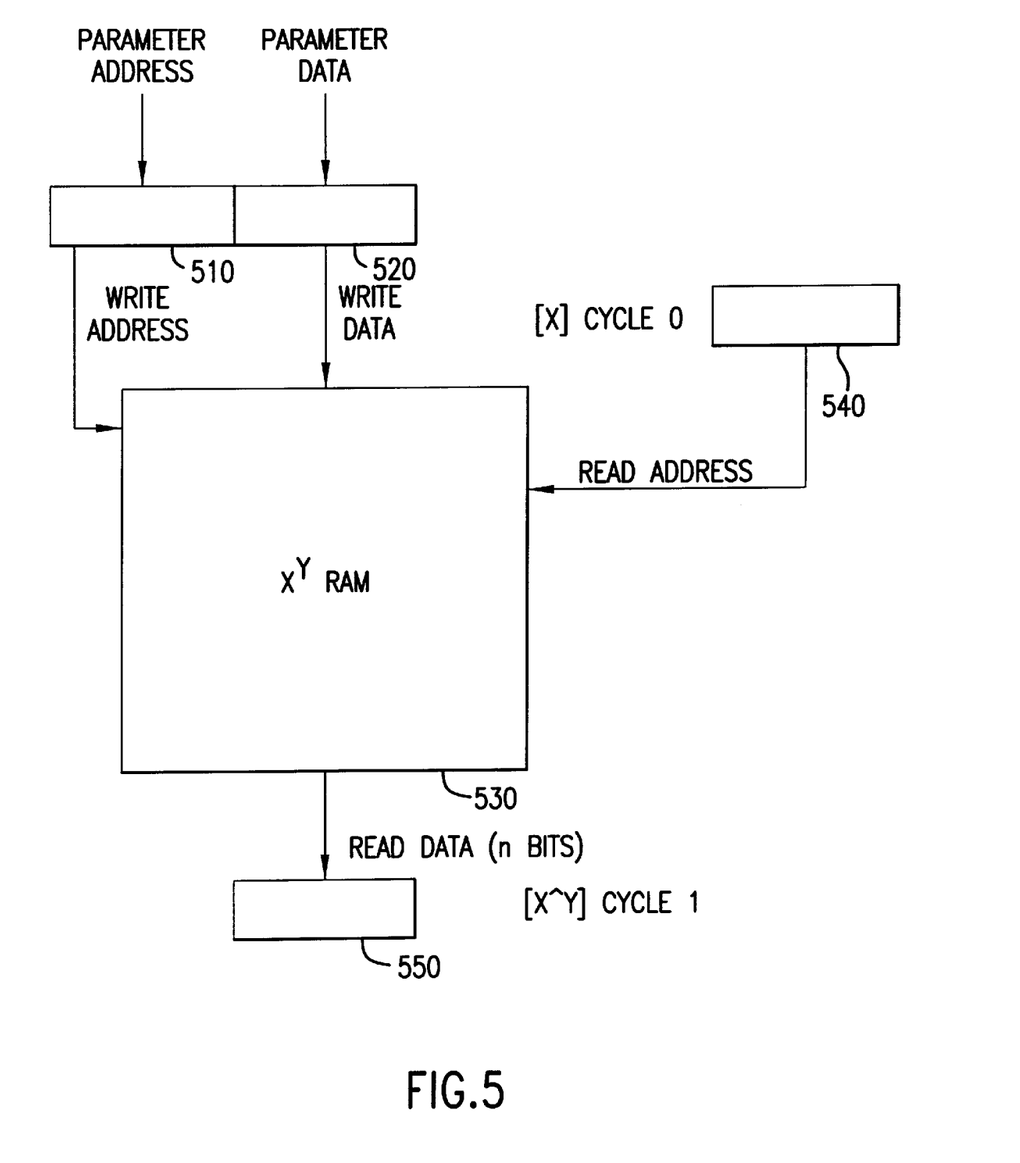
FIG. 5 illustrates a well known method of using a RAM lookup table.

As noted, well known methods of calculating $X^Y$ use either a ROM seed for complicated hardware or a RAM lookup table for an approximation. FIG. 5 illustrates a well known method of using a RAM lookup table to calculate $X^Y$. FIG. 5 includes an $X^Y$ RAM lookup table 530, write address flip-flop 510, write data flip-flop 520, read address flip-flop 540, and read data flip-flop 550. As recognized by skilled artisans, each flip-flop latches a data input on a clock input, and outputs the data based upon changes in the clock input.

For each separate value of Y, it is necessary to load the entire RAM lookup table 530. For each fixed Y, the term "address" refers to the value for X, because the actual value for X is used as an address into RAM 530. Similarly, for each fixed Y, the term "data" refers to the stored output value (i.e, $X^Y$) associated with the input X. Initially, for a fixed value of Y, all of the corresponding values of X and $X^Y$ are latched by write address flip-flop 510 and write data flip-flop 520, respectively. These values are then output into and stored in RAM 530 as write addresses (i.e., X values) and write data (i.e., $X^Y$ values), respectively.

In this system, the Y values are stored in the software, in lieu of the hardware. After RAM 530 has been filled up, (for a given value of Y) it is possible to use RAM 530 for function lookup. For a fixed value of Y, at cycle 0 of the pipeline processing cycle, the address input (i.e., X) latched by flip-flop 540 is used to address RAM 530. At cycle 1, a data output (i.e., $X^Y$) corresponding to the address input (i.e., X) is read into (and latched by) flip-flop 550.

Unfortunately, if the value for Y changes, it is necessary to reload the entire table. Again, this is done by loading the address inputs by way of flip-flop 510 and the data inputs by way of flip-flop 520. Accordingly, if Y changes, then the normal processing pipeline is halted, the entire table is reloaded, and then the processing pipeline is continued. If 10-bit addressing is used, where the input address is 10 bits, and the output data is also 10 bits, then 1024 cycles are wasted because 1024 new entries must be reloaded into the table. Accordingly, the result has a significantly deleterious impact upon processing power. To save processing cycles, those skilled in the art often reduce the number of addressing bits, to perhaps 8 bits. However, this causes reduced precision in the output data, i.e., in the calculated value for $X^Y$.

It is also possible to use ROM tables to seed an approximation of $X^Y$. In fact, it is possible to use either RAM or ROM tables with such approximation techniques as Newton-Raphson or Taylor Series expansions (i.e., where numerous derivatives of Y are taken). A large amount of math elevates looping and requires long pipelines. These higher-end systems require much more hardware, making them much more costly. Such methods also require more processing than that required by the present invention.

B. The Present Invention in Detail

Equation (5) sets forth an alternative representation of $X^Y$.

$$X^Y = \exp(\log_e(X^Y)) = \exp(\ln(X^Y)) = \exp(Y*\ln(X)) \qquad (5)$$

According to equation (5), it is possible to derive a value for ln(X), multiply this value by Y, and then find the exponential of the result. The present invention implements equation (5) using two ROMs and a multiplier to solve $X^Y$. In addition, the present invention translates the storage type of the variables from fixed point to floating point, and then back to fixed point, in order to preserve efficient accuracy with reduced hardware demands (i.e., area on the chip) and processing demands.

Figure 6:
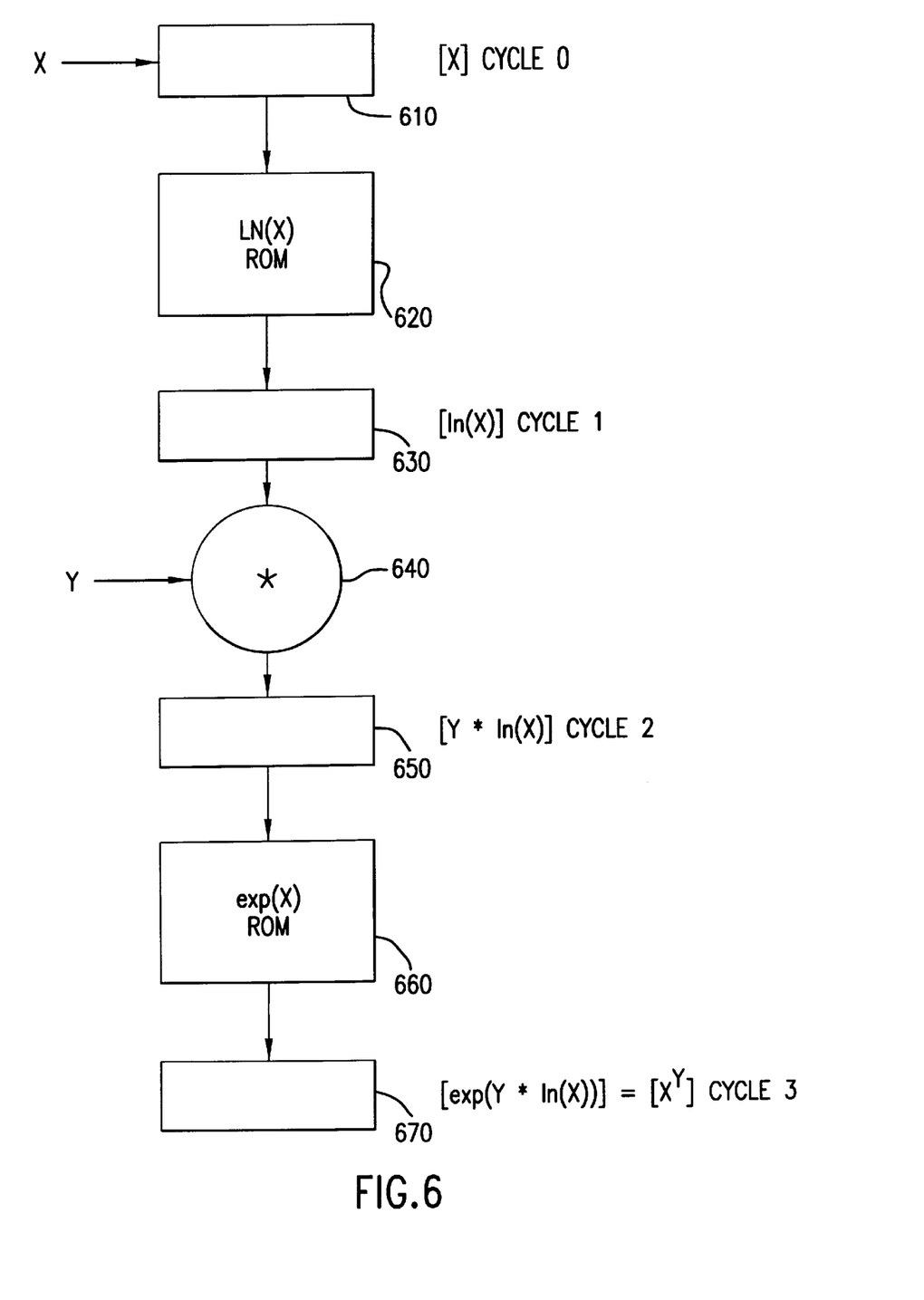
FIG. 6 illustrates a system and method of using a ROM lookup table for the present invention.

FIG. 6 illustrates the method and apparatus for implementing the present invention. FIG. 6 includes flip-flops 610, 630, 650 and 670, ln(x) ROM lookup table 620, exp(X) ROM lookup table 660 and multiplier 640.

Flip-flops 610, 630, 650 and 670 each latch a data input and a clock input, and output the data based upon the cycle of the clock input. Any comparable devices having a similar purpose can be used without departing from the present invention.

Multiplier 640 is an art-recognized multiplier, used to perform multiplication on two values, specifically two floating point values. In one well known manner, the multiplication is performed by the addition of the exponents of two input values and the multiplication of the mantissas of the two input values. Any comparable device having the same purpose of providing the multiplication can be used without departing from the present invention.

The ln(X) ROM lookup table 620 and exp(X) ROM lookup table 660 are storage devices used to store approximate values of data outputs for given address inputs. For example, for an n-bit address input value of $Z_1$, ln(X) ROM 620 provides an n-bit data output value for $\ln(Z_1)$. Similarly, for an n-bit address input value of $Z_2$, exp(X) ROM 660 provides an n-bit data output value for $\exp(Z_2)$. In the preferred embodiment, ln(X) lookup table 620 and exp(X) lookup table 660 are 1K×10 ROMs, indicating that input addresses (representing X) are 10-bits, output data (representing ln(X) or exp(X)) are 10-bits, and there are 1024 data entries. In each of these 1024 entries, an input address is matched to output data. Since the primary purpose of both the ln(X) ROM lookup table 620 and the exp(X) ROM lookup table 660 is to serve as lookup tables, any comparable lookup tables recognized by those skilled in the art can be used without departing from the present invention. For example, ln(X) and exp(X) RAM lookup tables can be used instead.

Figure 7:
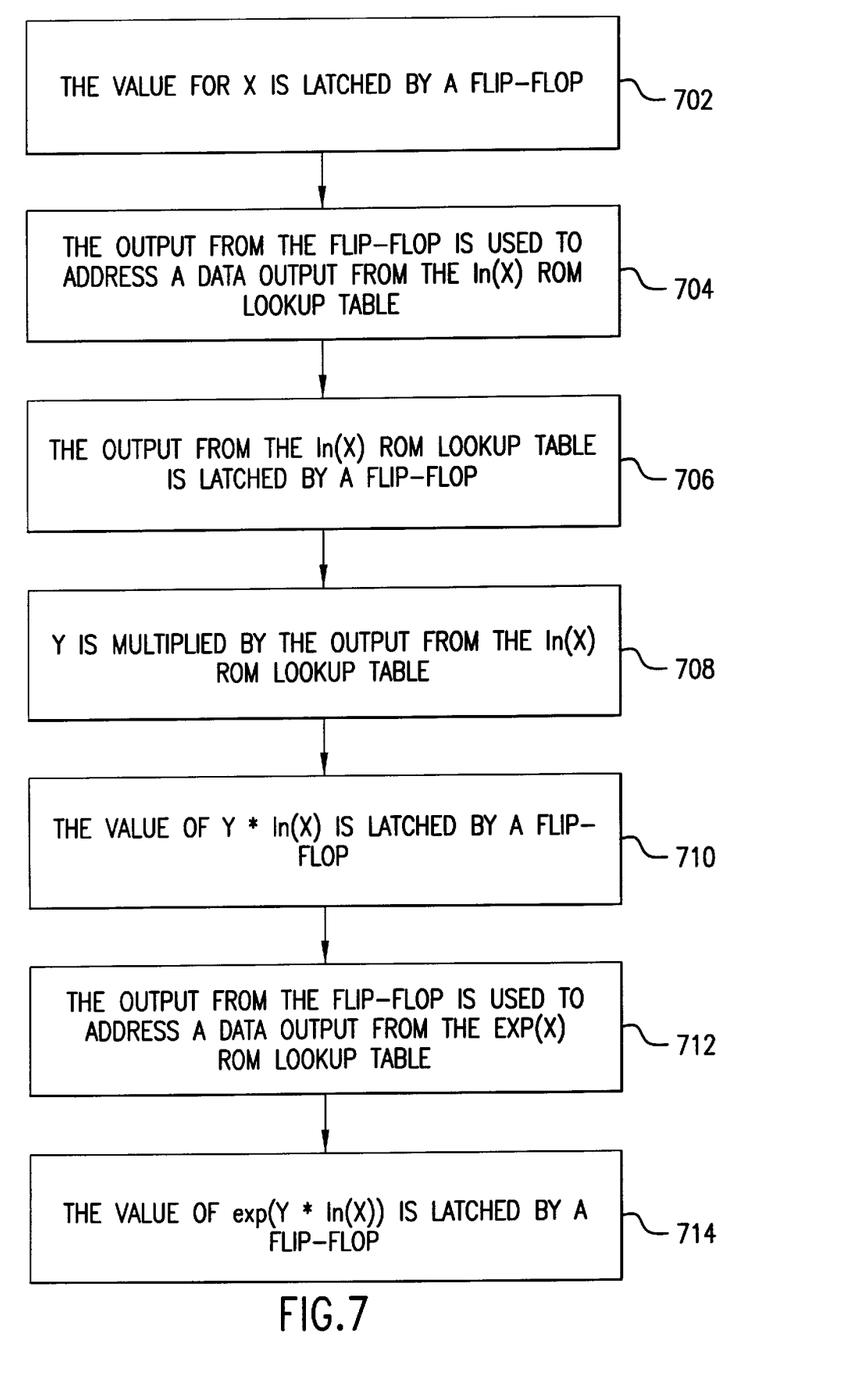
FIG. 7 illustrates a flow chart used to describe the present invention.

FIG. 7 is a flowchart describing the steps performed by the hardware listed in FIG. 6. The steps of FIG. 7 are used for exemplary purposes, and are not necessarily sequential in time. For example, it is possible that a first step and a second step occur at the same cycle of the processor (i.e., processing pipeline) clock. All steps can occur simultaneously.

In step 702, the value for X is latched by flip-flop 610. This occurs in cycle 0 of the processing pipeline. X is in a fixed point format. Those skilled in the art will recognize that X and all other values mentioned herein are in binary (base 2) format. In a preferred embodiment, X is 10-bits in length. In fixed point 0.10 format, X varies from the value $[0000000000]_{binary}$, used to represent $0_{decimal}$, to $[1111111111]_{binary}$, used to represent a number approximating just less than $1_{decimal}$. In short-hand notation, the range of X is in the range of [0 . . . 1].

In step 704, the n-bit output from flip-flop 610 is used to address a data output from ln(X) ROM lookup table 620. In the preferred embodiment, the input address and output data values are 10-bit values, respectively. Specifically, the 10-bit input address is used to locate a 10-bit reduced floating point data value in ln(X) ROM lookup table 620. The ln(X) ROM lookup table 620 is unique in that it converts an n-bit fixed point address input into an n-bit floating point data output.

Table 1 provides selected sample values for inputs to and outputs from ln(X) ROM lookup table 620. Specifically, Table 1 provides by column: (1) the X input, which serves as an address into ln(X) ROM lookup table 620; (2) the ROM output ln(X) in fixed point decimal, having accuracy to $(1.0\times10^{-6})_{decimal}$; (3) the exponent portion of the ROM output ln(X) in hexadecimal; (4) the mantissa portion of the ROM output ln(X) in hexadecimal; and (5) the ROM output ln(X) in hexadecimal, which comprises all 4 binary bits (in hexadecimal) of the exponent portion of the ROM output ln(X) and the most significant 6 binary bits (in hexadecimal) of the mantissa portion of the ROM output ln(X).

TABLE 1

| X input, in hexadecimal | ROM output ln(X), in decimal | exponent of ROM output in hexadecimal (no. of bits = 4) | mantissa of ROM output in hexadecimal (no. of bits = 6) | ROM output in hexadecimal |
| --- | --- | --- | --- | --- |
| 3FF | −0.000977 | 0 | 0 | 0 |
| 3FE | −0.001955 | 1 | 1 | 40 |
| 3FD | −0.002934 | 1 | 202 | 60 |
| 3FC | −0.003914 | 2 | 2 | 80 |
| 3FB | −0.004895 | 2 | 103 | 90 |
| 3FA | −0.005877 | 2 | 204 | A0 |

Referring to the first column of the first row, the first input X is the value $3FF_{hex}$, which is the hexadecimal notation for $[011\ 1111\ 1111]_{binary}$. In the ln(X) ROM lookup table 620, this value is represented by $3ff_{hex}/400_{hex}$, or $1023_{decimal}/1024_{decimal}$. The natural logarithm of this value is $\ln(1023/1024)_{decimal}$, which approximately equals $-0.00977_{decimal}$. This values is shown in the second column of Table 1.

The value −0.000977 can be represented as $2^{-10}{}_{decimal}\times 1.000000000000001000000000011_{binary}$. Under the I.E.E.E. standard, −0.000977 is represented as floating point $BA801003_{hex}$, which is [1(one sign bit)011 1010 1 (eight exponent bits) 000 0000 0001 0000 0000 0011 (twenty three mantissa bits)]$_{binary}$. The above representation of the exponent is $127_{decimal}$ greater in value than the actual exponent, so that it is necessary to subtract $127_{decimal}$ to yield the true value for the exponent.

In the present invention, the ln(X) ROM lookup table 620 uses a reduced floating point notation. It is understood that the value −0.000977 can be represented as $2^{-10}{}_{decimal}\times 1.000000_{binary}$. The value of $10_{decimal}$ is subtracted from the value of the exponent in order to reduce the number of bits required to represent the value in reduced floating point notation. Represented in hexadecimal, the value for the exponent is 0, as shown in column 3 of Table 1. Also, a sign bit of 1 (negative) is assumed.

In addition, only the six most significant binary bits of the mantissa, expressed in hexadecimal notation, are used. As is conventional, the value of $1_{binary}$ is dropped from this representation. Therefore, as shown in column 4 of Table 1, the mantissa is 0. Accordingly, the output of ln(X) ROM lookup table 620 is $0_{hexadecimal}$, which is [(no sign bit)0000 (four exponent bits)000000 (six mantissa bits)]$_{binary}$. The value is shown in column 5 of Table 1.

In step 706, the n-bit floating point output from ln(X) ROM lookup table 620 is latched by flip-flop 630. In the preferred embodiment alluded to above the output value is in 10-bit reduced floating point notation. This step occurs at cycle 1 of the processing pipeline. In the above-noted reduced floating point format, X varies from the value $[0000000000]_{binary}$ to $[1111111111]_{binary}$. In short-hand notation, the range of X is approximately in the range of $[-2^{-n} \ldots -2^{n}]$.

In step 708, the value of Y, which is in either a regular floating point or in a reduced floating point format, is multiplied by the value for ln(X) output from flip-flop 640 (in reduced floating point format). In a preferred embodiment, a well-known floating point multiplication is performed, wherein the mantissas of Y and ln(X) are multiplied and the exponents of Y and ln(X) are added.

In step 710, the value for Y*ln(X) is latched by flip-flop 650. This step occurs at cycle 2 of the processing pipeline. The resulting value is in the range of approximately [0 . . . $-2^{2n}$] in a reduced floating point notation, where Y is a positive number. To reduce the minimum number of bits needed and to eliminate unusable data from the wide range of Y*ln(X), the resulting values are clamped down to values in the range [0 . . . $-2^{n}$]. In other words, values in the range of $[-2^{n} \ldots -2^{2n}]$ are assigned to $-2^{n}$, which is assumed to the largest negative value.

In step 712, the n-bit reduced floating point value latched by flip-flop 650 is used to address a data output from exp(X) ROM lookup table 660. In the preferred embodiment, the output from flip-flop 650 is a 10-bit reduced floating point value. This 10-bit reduced floating point value is used to locate a 10-bit fixed point data value in exp(X) ROM lookup table 660. The exp(X) ROM lookup table 660 is unique in that it converts an n-bit reduced floating point address input into an n-bit fixed point data output.

Table 2 provides selected sample values for inputs to and outputs from exp(X) ROM lookup table 660. Specifically, Table 2 provides by column: (1) sample input values of Y*ln(X) in hexadecimal, which serve as addresses into exp(X) ROM lookup table 660; (2) the true decimal representations for the Y* ln(X) values represented in the first column, having accuracy to $(1.0\times10^{-6})_{decimal}$; (3) the decimal representations of exp(Y*ln(X)), where Y*ln(X) are taken from the second column; and (4) the ROM output of exp(Y*ln(X)) in hexadecimal, expressing 1 0-bit fixed point values.

TABLE 2

| ROM input Y*ln(X), in hexadecimal | true decimal representation of Y*ln(X) ROM input | decimal representation of exp(Y*ln(X)) | ROM output in hexadecimal |
|---|---|---|---|
| E  | −0.001190 | 0.998811 | 3FE |
| F  | −0.003205 | 0.998795 | 3FE |
| 10 | −0.001221 | 0.998780 | 3FE |
| 11 | −0.001236 | 0.998765 | 3FE |
| 12 | −0.001251 | 0.998750 | 3FE |
| 13 | −0.001266 | 0.998734 | 3FE |

In a preferred embodiment, the values for the decimal representations of exp(Y*ln(X)) of the third column are converted into 10-bit binary ROM output values, which are shown in hexadecimal notation in the fourth column. As illustrated, ROM input addresses $E_{hex}$–$13_{hex}$ map to the same ROM output data $3FE_{hex}$ (representing $X^Y$), which is $[011\ 1111\ 1110]_{binary}$. In fact, ROM input addresses $E_{hex}$–$40_{hex}$ all map to $3FE_{hex}$. Similarly, addresses $41_{hex}$–$60_{hex}$ map to $3FD_{hex}$, addresses $61_{hex}$–$80_{hex}$ map to $3FC_{hex}$, etc.

In step 714, the value for exp(Y*ln(X)) is latched by flip-flop 670. This step occurs at cycle 3 of the processing pipeline. In short-hand notation, the range of the value is [0 . . . 1].

IV. An Implementation of the Invention

Figure 8:
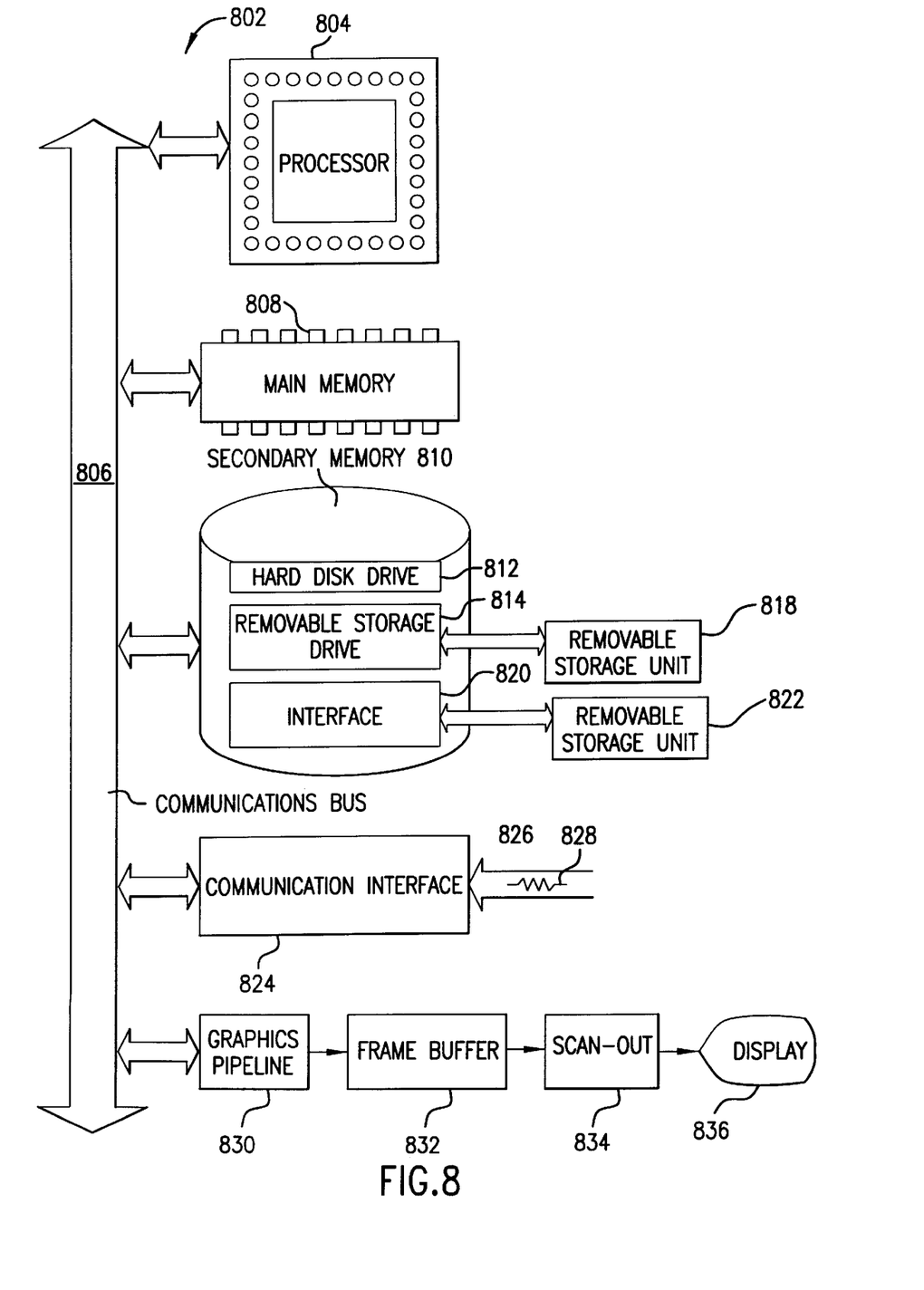
FIG. 8 illustrates a block diagram of a computer useful for implementing elements of the present invention.

As stated above, the invention may be implemented using hardware. software or a combination thereof and may be implemented in a computer system or other processing system. In fact, in one embodiment, the invention is directed toward a computer system capable of carrying out the functionality described herein. An example computer system 802 is shown in FIG. 8. The computer system 802 includes one or more processors, such as processor 804. The processor 804 is connected to a communication bus 806. Various software embodiments are described in terms of this example computer system. After reading this description, it will become apparent to a person skilled in the relevant art how to implement the invention using other computer systems and/or computer architectures.

Computer system 802 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 802. Such means can include, for example, a removable storage unit 822 and an interface 820. Examples of such can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 818 to computer system 802.

Computer system 802 can also include a communications interface 824. Communications interface 824 allows software and data to be transferred between computer system 802 and external devices. Examples of communications interface 824 can include a modem, a network interface (such as an Ethernet card), a communications port, a PCM-CIA slot and card, etc. Software and data transferred via communications interface 824 are in the form of signals which can be electronic, electromagnetic, optical or other signals capable of being received by communications interface 824. These signals 826 are provided to communications interface via a channel 828. This channel 828 carries signals 826 and can be implemented using wire or cable, fiber optics, a phone line, a cellular phone link, an RF, link and other communications channels.

Computer system 802 can also includes a graphics pipeline 830. The graphics pipeline comprises the hardware and software that take input commands and produce therefrom data in the format of pixels. The pixels are output to frame buffer 832. Frame buffer 832 varies from a simple buffer capable of storing two-dimensional images, to a state-of-the-art device capable of displaying textured, three-dimensional, color images. Scan-out device 834 comprises rendering hardware that selectively reads the pixels from frame buffer 832 and transmits the pixels to display 836. Display 836, comprising for example a cathode ray tube (CRT), provides a physical display of the pixels. The scan-out device 834 and display 836 comport in function with the sophistication of the frame buffer 832.

In this document, the terms "computer program medium" and "computer usable medium" are used to generally refer to media such as removable storage device 818, a hard disk installed in hard disk drive 812, and signals 626. These computer program products are means for providing software to computer system 802.

Computer programs (also called computer control logic) are stored in main memory and/or secondary memory 810. Computer programs can also be received via communications interface 824. Such computer programs, when executed, enable the computer system 802 to perform the features of the present invention as discussed herein. In particular, the computer programs, when executed, enable the processor 804 to perform the features of the present invention. Accordingly, such computer programs represent controllers of the computer system 802.

In an embodiment where the invention is implement using software, the software may be stored in a computer program product and loaded into computer system 802 using removable storage drive 814, hard drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While the invention has been particularly shown and described with reference to preferred embodiments thereof, it will be understood by those skilled in the relevant art that various changes in form and details may be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for approximating the value of $X^Y$ in computer hardware, where X and Y are real numbers, the method comprising steps of:

(a) using a fixed point representation of X as an address input into a logarithmic lookup table to determine a floating point data output approximating a logarithm of the fixed point representation of X;

(b) multiplying said floating point data output by a floating point representation of Y to yield a product; and (c) using said product as an address input into an inverse logarithmic lookup table to determine a fixed point data output approximating the value of $X^Y$.

2. The method according to claim 1, wherein step (a) further comprises:

latching said fixed point representation of X in a flip-flop; and outputting said fixed point representation of X at cycle 0 of a processing pipeline.

3. The method according to claim 1, wherein step (a) further comprises:

representing said floating point data output as a reduced floating point data output.

4. The method according to claim 3, wherein said reduced floating point data value is represented by four binary bits of exponent and six binary bits of mantissa.

5. The method according to claim 1, wherein X is represented as a 10-bit fixed point value.

6. The method according to claim 1 wherein step (a) further comprises:

latching said floating point data output in a flip-flop; and outputting said floating point data output at cycle 1 of a processing pipeline.

7. The method according to claim 1, wherein step (b) further comprises:

representing said product as a reduced floating point data.

8. The method according to claim 1, wherein step (b) further comprises:

latching said product in a flip-flop; and outputting said product at cycle 2 of a processing pipeline.

9. The method according to claim 1, wherein said product is an n-bit floating point representation, and wherein step (b) further comprises:

clamping values for said product to a range of 0 to $-2^n$.

10. The method according to claim 1, wherein step (c) further comprises:

latching said fixed point data output in a flip-flop; and outputting said fixed point data output at cycle 3 of a processing pipeline.

11. The method according to claim 1, wherein said logarithmic lookup table is a natural logarithm lookup table, and wherein said inverse logarithmic lookup table is an inverse natural logarithm lookup table.

12. A system for approximating the value of $X^Y$ in computer hardware, where X and Y are real numbers, comprising:

means for using a fixed point representation of X as an address input into a logarithmic lookup table to determine a floating point data output approximating a logarithm of the fixed point representation of X;

means for multiplying said floating point data output by a floating point representation of Y to yield a product; and means for using said product as an address input into an inverse logarithmic lookup table to determine a fixed point data output approximating the value of $X^Y$.

13. The system according to claim 12, wherein said means for using a fixed point representation of X comprises:

a flip-flop for latching and outputting therefrom said fixed point representation of X;

a logarithmic ROM lookup table for converting said fixed point representation of X into said floating point data output; and a flip-flop for latching and outputting therefrom said floating point data output.

14. The system according to claim 12, wherein said means for using said product as an address comprises:

a flip-flop for latching and outputting therefrom said product;

an inverse logarithmic ROM lookup table for converting said product into said fixed point data output; and a flip-flop for latching and outputting therefrom said fixed point data output.

15. The system according to claim 12, wherein said logarithmic lookup table is a natural logarithm lookup table, and wherein said inverse logarithmic lookup table is an inverse natural logarithm lookup table.

* * * * *